US011311941B2

(12) United States Patent
Lefebvre et al.

(10) Patent No.: US 11,311,941 B2
(45) Date of Patent: Apr. 26, 2022

(54) FABRICATION OF PALLADIUM-CHROMIUM ALLOY MICROPARTICLES

(71) Applicant: General Electric Company, Schenectady, NY (US)

(72) Inventors: Louis Lefebvre, Valcourt (CA); Ehsan Marzbanrad, Waterloo (CA); Ehsan Toyserkani, Waterloo (CA); Jeremy Vandenberg, Brinston (CA)

(73) Assignee: General Electric Company, Schenectady, NY (US)

( * ) Notice: Subject to any disclaimer, the term of this patent is extended or adjusted under 35 U.S.C. 154(b) by 365 days.

(21) Appl. No.: 16/372,002

(22) Filed: Apr. 1, 2019

(65) Prior Publication Data

US 2020/0306834 A1 Oct. 1, 2020

(51) Int. Cl.
| | |
|---|---|
| *B22F 9/24* | (2006.01) |
| *B22F 1/00* | (2022.01) |
| *C09D 11/52* | (2014.01) |
| *B82Y 40/00* | (2011.01) |
| *B82Y 30/00* | (2011.01) |

(52) U.S. Cl.
CPC ............. *B22F 9/24* (2013.01); *B22F 1/0018* (2013.01); *C09D 11/52* (2013.01); *B22F 2301/20* (2013.01); *B22F 2301/25* (2013.01); *B22F 2304/054* (2013.01); *B22F 2998/00* (2013.01); *B82Y 30/00* (2013.01); *B82Y 40/00* (2013.01)

(58) Field of Classification Search
CPC ........................................................ B22F 9/24
See application file for complete search history.

(56) References Cited

U.S. PATENT DOCUMENTS

| | | | |
|---|---|---|---|
| 6,783,569 B2 | 8/2004 | Cheon et al. | |
| 7,547,347 B2 | 6/2009 | Yang et al. | |
| 7,842,281 B2 | 11/2010 | Haik et al. | |
| 7,892,520 B2 | 2/2011 | Lu et al. | |
| 2007/0290175 A1* | 12/2007 | Kim ................. | B22F 1/025 |
| | | | 252/500 |
| 2011/0282110 A1* | 11/2011 | Johnston .............. | C07C 29/149 |
| | | | 568/885 |
| 2016/0339517 A1 | 11/2016 | Joshi et al. | |
| 2017/0253758 A1 | 9/2017 | Druffel et al. | |
| 2018/0282173 A1 | 10/2018 | Chou et al. | |

\* cited by examiner

*Primary Examiner* — William D Young
(74) *Attorney, Agent, or Firm* — Hanley, Flight & Zimmerman, LLC

(57) ABSTRACT

Methods for making a plurality of microparticles from a reaction solution that includes an organic acid in a solvent are provided. The method may include adding a chromium salt and a palladium salt to the reaction solution; bringing the reaction solution to a reaction temperature of 0° C. to 150° C. to form palladium cations and chromium cations within the reaction solution such that the palladium cations and chromium cations combine to form the plurality of microparticles that precipitate from the reaction solution; and collecting the microparticles from the reaction mixture. The plurality of microparticles comprises a palladium-chromium alloy. The palladium-chromium alloy may comprise chromium in a weight percentage of 1% to 20% of the total weight of the palladium-chromium alloy.

13 Claims, 3 Drawing Sheets

FABRICATION OF PALLADIUM-CHROMIUM ALLOY MICROPARTICLES

FIELD

The present disclosure generally relates to fabrication methods for the formation of palladium-chromium alloy microparticles.

BACKGROUND

Direct-Ink-Writing (DIW), sometimes referred to as robocasting, is an additive manufacturing technique in which a filament of a paste or mist of liquid (referred to as an "ink" per the analogy with conventional printing techniques) is extruded or injected from a small nozzle while the nozzle is moved across a platform. This technology usually falls under "material extrusion" or "material jetting" classes of additive manufacturing. The object is thus built by "writing" the required shape layer by layer. In DIW, a 3D computer-aided design (CAD) model is divided up into layers in a similar manner to other additive manufacturing techniques. The ink (typically a ceramic slurry or liquid) is then extruded or injected through a small nozzle as the nozzle's position is controlled, drawing out the shape of each layer of the CAD model. The ink exits the nozzle in a liquid-like state but retains its shape immediately, exploiting the rheological property of shear thinning. It is distinct from fused deposition modelling as it does not rely on the solidification or drying to retain its shape after extrusion.

Aerosol-based direct-write refers to the additive process of printing features of a component from a CAD model using an apparatus which creates a liquid or solid aerosol beam from an aerosol ink. Direct-write technologies are particularly useful in the microelectronics industry for forming components such as interconnects, sensors, and thin film transistors (TFTs), with new applications for aerosol direct-write being rapidly conceived.

However, aerosol-based direct-write capabilities hinge on the types of consumable metallization inks that are available. The ink compositions for aerosol-based direct-write are tailored for specific rheological, surface, and mass transfer properties. Improved ink compositions are welcome in the art, particularly for certain reactive metals (such as chromium-containing microparticles that are significantly more susceptible to poisons than conventional silver or gold inks) that lead to inks having a prohibitively short shelf life and/or the tendency to agglomerate and poorly atomize.

Palladium-chromium metal microparticle mixtures, where the chromium exists in a reduced state, are not available in the current market due to the technical difficulty involved with their formation without aggregating, oxidizing, or destabilizing the particles. For example, the electronegativity of palladium and chromium makes the simultaneous reduction of palladium cations and chromium cations be a difficult process.

As such, a need exists for improved methods of forming palladium-chromium alloy microparticles, particularly palladium-chromium alloy microparticles, such as for use within aerosol-based direct-write inks.

BRIEF DESCRIPTION

Aspects and advantages will be set forth in part in the following description, or may be obvious from the description, or may be learned through practice of the invention.

Methods are generally provided for making a plurality of microparticles from a reaction solution that includes an organic acid in a solvent. In one embodiment, the method includes adding a chromium salt and a palladium salt to the reaction solution; bringing the reaction solution to a reaction temperature of 0° C. to 150° C. to form palladium cations and chromium cations within the reaction solution such that the palladium cations and chromium cations combine to form the plurality of microparticles that precipitate from the reaction solution; and collecting the microparticles from the reaction mixture. The plurality of microparticles comprises a palladium-chromium alloy. For example, the palladium-chromium alloy may comprise chromium in a weight percentage of 1% to 20% of the total weight of the palladium-chromium alloy.

In particular embodiments, the chromium salt comprises chromium nitrate, chromium chloride, chromium acetic acid, or a mixture thereof, and/or the palladium salt comprises palladium nitrate, palladium chloride, palladium acetic acid, or a mixture thereof. The reaction mixture may further comprise sodium nitrate, such as being present in the reaction mixture at a molar ratio of sodium nitrate to a total of the chromium cations and palladium cations (e.g., a molar ratio is greater than 2). In one particular embodiment, the reaction mixture comprises a molar ratio of sodium nitrate to the organic acid of 2 to 30. The reaction mixture further may, in particular embodiments, include trisodium citrate.

An aerosol ink is also generally provided, which may include a plurality of palladium-chromium alloy-containing metallic microparticles dispersed in a solvent system, wherein the palladium-chromium alloy-containing metallic microparticles comprise a palladium-chromium alloy. For example, the solvent system may include a mixture of a first solvent and a second solvent with the second solvent has a vapor pressure that is lower than the first solvent.

A method is also generally provided for making a plurality of microparticles from a reaction solution that includes nitrate anions and tannic acid in a water. In one embodiment, the method includes adding chromium nitrate and palladium nitrate to the reaction solution at a reaction temperature of 60° C. to 80° C. to form palladium cations and chromium cations within the reaction solution such that the palladium cations and chromium cations combine to form the plurality of microparticles that precipitate from the reaction solution; and collecting the microparticles from the reaction mixture. The palladium-chromium alloy comprises chromium in a weight percentage of 5% to 13% of the total weight of the palladium-chromium alloy. The plurality of microparticles comprises a palladium-chromium alloy.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
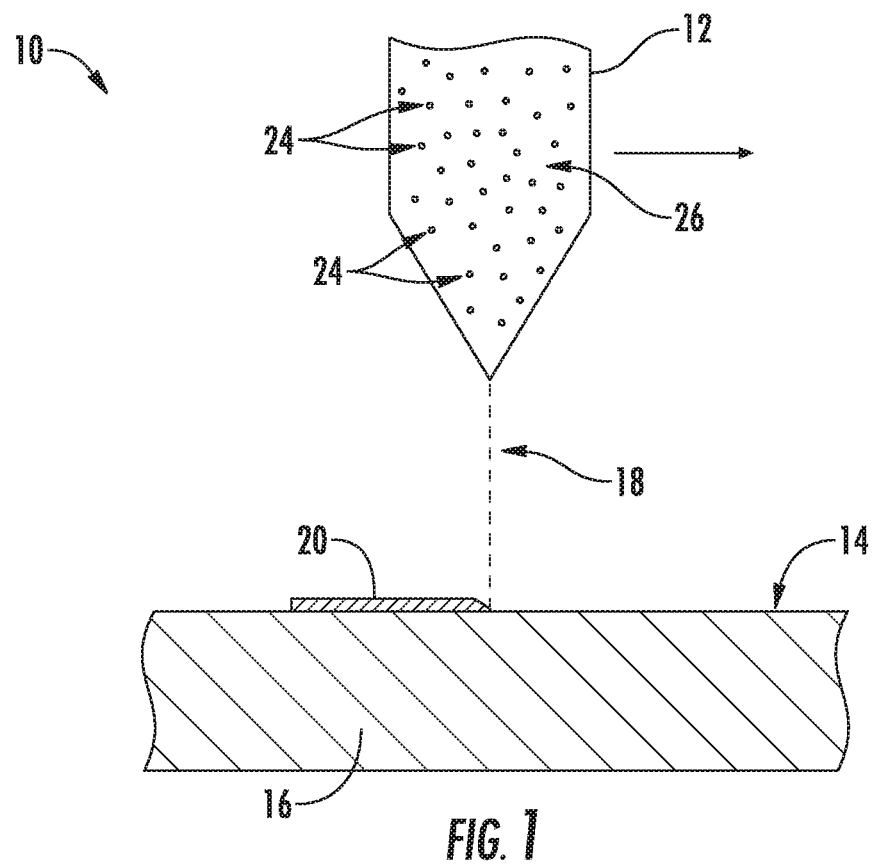
FIG. 1 shows a diagram of a direct write nozzle applying an aerosol ink to form a palladium-chromium alloy-containing metal layer onto a surface of a component.
Figure 2:
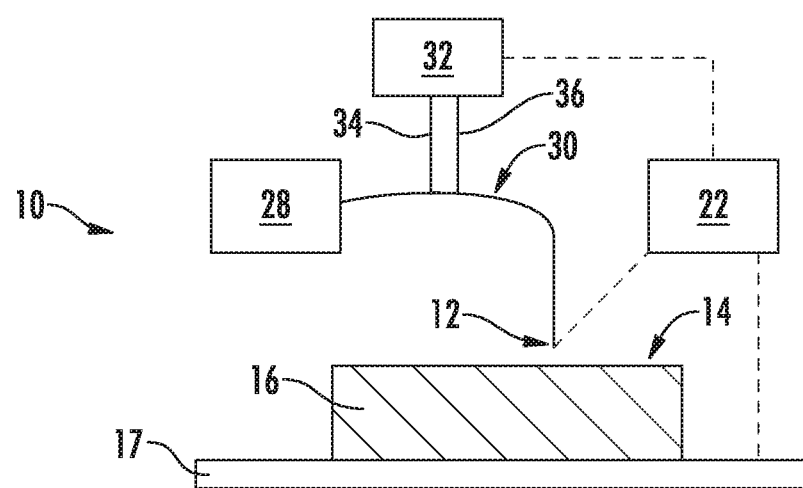
FIG. 2 shows a diagram of a direct write system including a supply of aerosol ink, a motion system controller, a heated substrate, a nozzle, and its gas flow and temperature controller.
Figure 3:
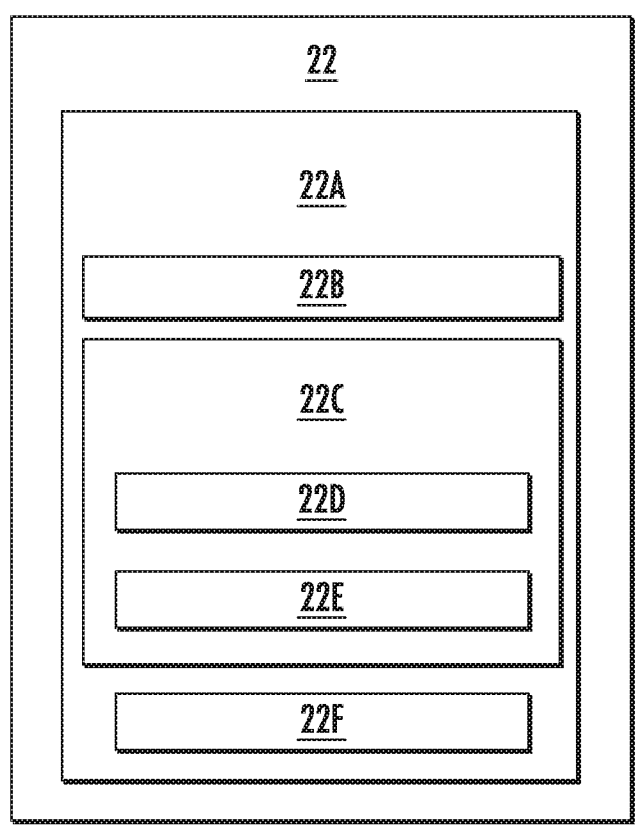
FIG. 3 shows a diagram of an exemplary controller for use with a direct write system, such as in FIGS. 1 and 2.
Figure 4:
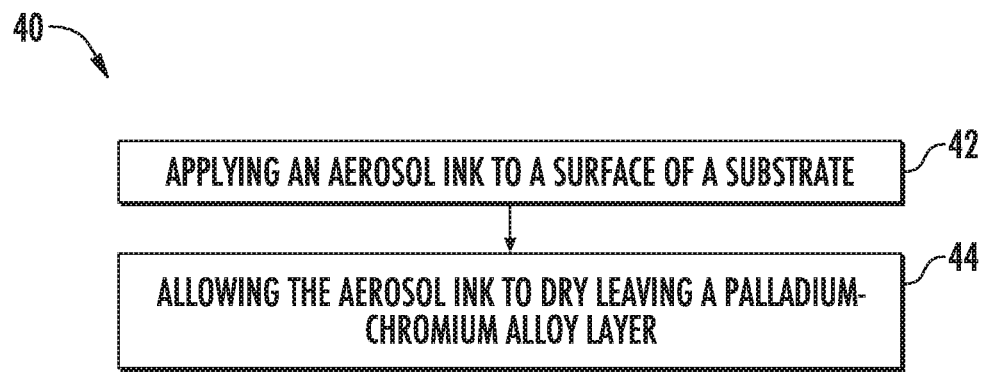
FIG. 4 shows an exemplary method of a direct write process using an aerosol ink.
Figure 5:
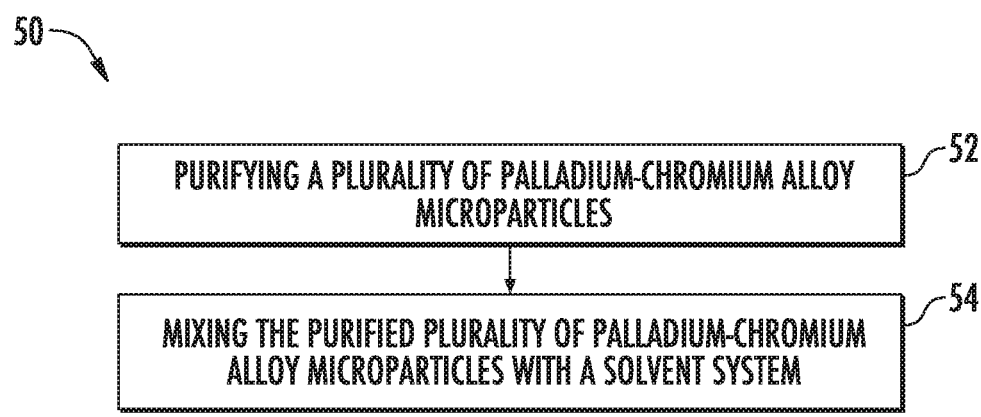
FIG. 5 shows an exemplary method of forming an aerosol ink that includes a plurality of palladium-chromium alloy microparticles within a solvent system.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one feature from another and are not intended to signify importance of the individual components.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the prefix "micro" refers to the micrometer scale up to about 1 micrometer ($\mu m$). For example, particles having an average diameter on the micrometer scale (e.g., less than 1 $\mu m$) are referred to as "microparticles." As used herein, the prefix "nano" refers to the nanometer scale up to about 100 nm. For example, particles having an average diameter on the nanometer scale (e.g., from about 0.1 nm to about 100 nm) are referred to as "nanoparticles."

As used herein, the term "substantially free" means no more than an insignificant trace amount may be present that does not alter any characteristic of the composition. The term "substantially free" also encompasses completely free.

As used here, the term "chromium-containing" refers to a material (e.g., particle, ink, etc.) that includes chromium in its elemental, metal state. This elemental chromium may also be referred to as being in its reduced state, which is distinct from chromium's cationic state such as found in chromium oxides, chromium nitrides, etc.

Methods are generally provided for the fabrication of microparticles that include a palladium-chromium alloy. In particular embodiments, the microparticles may be synthesized by a co-precipitation method. The method may generally include adding a chromium salt and a palladium salt to a reaction solution at a reaction temperature to form palladium cations and chromium cations within the reaction solution. Then, the palladium cations and chromium cations combine to form the plurality of microparticles that precipitate from the reaction solution. The co-precipitation method may also be controlled as to the size of the fabricated microparticles during these methods. In one embodiment, the fabrication of such microparticles may be formed without a catalyst in the reaction solution.

Without wishing to be bound by any particular theory, it is believed that too much palladium relative to chromium in the alloy causes de-alloying of the palladium and chromium. In particular, it is believed that palladium can only hold a maximum amount of chromium in solution. The microparticles may include a palladium-chromium alloy having a chromium in a weight percentage of 1% to 20% of the total weight of the palladium-chromium alloy. In one particular embodiment, the palladium-chromium alloy includes chromium in a weight percentage of 5% to 15% of the total weight of the palladium-chromium alloy.

In certain embodiments, the palladium-chromium alloy may be substantially free from other metal elements (i.e., the palladium-chromium alloy consists of palladium and chromium). In other embodiments, an alloying element may be included within the palladium-chromium alloy, such as up to 80% by weight. For example, suitable alloying elements may include copper, nickel, platinum, gold, silver, iron, titanium, iridium, cobalt, rhodium, tungsten, or mixtures thereof.

Generally, the reaction solution includes a bulky organic acid in a solvent, such as tannic acid, a saponin, or a mixture thereof. Without wishing to be bound by any particular theory, it is believed that the presence of a bulky organic acid (e.g., tannic acid) in the reaction mixture moderates the reaction of palladium and chromium. Thus, the bulky organic acid (e.g., tannic acid) may limit the growth of the microparticles to a particular size. For example, the nanoparticles may have an average diameter of 5 nm to 30 nm. In one particular embodiment, the nanoparticles have a maximum dimension of 5 nm to 30 nm. However, in other embodiments, microparticles may be formed (e.g., having a maximum dimension of less than 1 $\mu m$, such as less than 500 nm).

In one embodiment, the chromium salt includes chromium nitrate, chromium acetate, chromium chloride, chromium iodide, chromium fluoride, chromium acetic acid, chromium phosphate salts, or a mixture thereof. Upon disassociation of the chromium salt, a chromium cation may be formed (e.g., $Cr^{3+}$). For example, disassociation of chromium nitrate forms $Cr^{3+}$ and $NO_3^-$.

Similarly, the palladium salt may include palladium nitrate, palladium acetate, palladium chloride, palladium iodide, palladium fluoride, palladium acetic acid, palladium phosphate salts, or a mixture thereof. Upon disassociation of the palladium salt, a palladium cation may be formed (e.g., $Pd^{2+}$). For example, disassociation of palladium nitrate forms $Pd^{2+}$ and $NO_3^-$.

In one particular embodiment, for example, chromium nitrate and palladium nitrate may be in the reaction solution, though any combination of the chromium salts and palladium salts discussed above may be utilized. The use of such nitrate salts are particularly useful in embodiments where additional nitrate ions are in the reaction solution, such as sodium nitrate. In one embodiment, the sodium nitrate may be present in the reaction mixture in a desired molar ratio of sodium nitrate to a total of the chromium cations and palladium cations. For example, the molar ratio may be greater than 2, such as 3 to 6. In one embodiment, the reaction mixture may also include a molar ratio of sodium nitrate to tannic acid of 2 to 30, such as 3 to 20.

Additionally, trisodium citrate may be included in the reaction solution, which may be added to control the reaction parameters and rate of reaction as well as serve as a reducing agent in the reaction.

The reaction solution may be an aqueous solution, such that the solvent includes water. In one embodiment, the solvent is water without any additional solvents or additives therein (i.e., the solvent consists of water). In one embodiment, the reaction solution is free from any oxidizing agents.

Prior to, during, or after adding the chromium salt and the palladium salt to the reaction solution, the reaction solution may be brought to a reaction temperature of 0° C. to 150° C. (e.g., 50° C. to 100° C., such as 60° C. to 80° C.). Generally, control of the reaction temperature leads to more uniform microparticle synthesis. The reaction solution can be sustained at the reaction temperature for a reaction time of 10 minutes to 30 minutes (e.g., 15 to 20 minutes).

After formation, the microparticles may precipitate from the reaction solution to be extracted from the reaction solution. For example, the microparticles may be centrifuged out of the reaction solution. The microparticles may be washed after extraction. By using these method, at least 95% by weight of the chromium and palladium may be extracted from the method in the form of the microparticles.

The microparticles formed according to these methods may be used in a variety of applications, including within an aerosol ink. In particular, the aerosol ink provided allows for the use of the Direct Write process for chromium containing alloys. In particular embodiments, the aerosol ink produces adequate processing properties such as aerosol density, aerosol uniformity, and/or consistent mass deposition rate for the use with Direct-Write processes. For example, the aerosol ink may have an appropriate shelf life for use with commercial Direct-Write applications.

In one embodiment, the aerosol ink includes a plurality the palladium-chromium alloy microparticles dispersed within a solvent system. Generally, palladium-chromium alloy microparticles have different properties compared to their bulk counterparts. Palladium-chromium alloy microparticles have properties that may be dependent on the particle size. For example, it is well-known that palladium-chromium alloy microparticles absorb light and can have melting points well below their bulk materials counterparts. The wavelength of the absorbance spectrum becomes shorter as the particle size decreases. This is a function of increased surface energy of the smaller particles. This small size, and increased surface energy, also provides a mechanism for chemical functionalization to occur on the surface of the metal particle. It is such a specific chemical surface modification that is a focus of embodiments of the present invention.

The shape of the palladium-chromium alloy microparticles may vary based on the desired printing application. For example, in certain embodiments, the palladium-chromium alloy microparticles may have a substantially spherical shape, as discussed above. In other embodiments, the palladium-chromium alloy microparticles may be flake-like shapes or other irregular shapes.

In particular embodiments, the palladium-chromium alloy microparticles may be purified before being utilized within the aerosol ink. Such a purification process may be configured to remove contaminants and other materials that may poison the resulting aerosol ink composition. For example, reactive materials may be removed from the palladium-chromium alloy microparticles. In one embodiment, the reactive species are dissolved gasses of oxygen and nitrogen, as well as excess nitrates and acetate salts (e.g., organic/inorganic salts) that decompose into oxygen or nitrogen. For instance, the solvents may be degassed under vacuum to remove these oxygen and nitrogen containing impurities and stored under an inert gas. Additionally, solvent exchanges may be performed to dilute the species, such as through precipitation of the solids, decantation, and redispersion of the solids in fresh solvent.

The palladium-chromium alloy microparticles may be loaded to a maximum solvable amount. For example, the plurality of palladium-chromium alloy microparticles may be present in a loading amount of 1% to 30% by weight of the total aerosol ink (e.g., 5% to 10% by weight).

The solvent system may generally have a viscosity suitable for its desired use, which may be 0.5 cP to 10,000 cP depending on the particular application. In an embodiment for Direct-Write inks, the viscosity may be relatively low, such as 0.5 cP to 30 cP (e.g., a viscosity of 0.5 cP to 10 cP). This relatively low viscosity allows for stabilization of the chromium-containing metallic microparticles against gravitational settling. For example, viscosity may start having a marked effect on the atomization process of the Direct-Write ink, and the ultrasonic chamber cannot use inks greater than 30 cP.

In one embodiment, the solvent system includes at least two solvents that are miscible with each other. For example, the solvent system may be a dual solvent system (i.e., including two miscible solvents: a first solvent and a second solvent). Although described as including a first solvent and a second solvent, it is to be understood that additional solvents may be included within the solvent system as desired.

The first solvent may be included within the solvent system to suspend the particles within the solvent system and to evaporate in a controlled manner upon printing of the ink. For example, the first solvent may have a higher vapor pressure than the second solvent in the solvent system such that the first solvent evaporates faster than the second solvent during printing. Particularly suitable first solvents that may be utilized within the solvent system include, but are not limited to, 1-methoxy-2-propanol, n-decane, n-hexane, n-heptane, n-octane, n-nonane, alpha-terpineol, cyclohexane, isopropanol, simple carbon chain alcohols (e.g., up to 15 carbons in chain) such as decanol, isobutyl alcohol, benzyl alcohol, and mixtures thereof.

For example, the solvent system may include a first solvent that is an alcohol-based solvent having at least one alcohol moiety to increase the solvating capacity of the solvent system to keep the chromium-containing metallic microparticles suspended therein. Additionally, the alcohol-based solvent may be configured to decrease the oxygen content within the aerosol ink to inhibit reaction (e.g., oxidation) with chromium within the chromium-containing metallic microparticles. In one particular embodiment, the alcohol-based solvent may include at least both a hydroxyl group (i.e., the alcohol moiety) and an ether moiety within the molecule, such as 1-methoxy-2-propanol.

The second solvent may be included within the solvent system to have a relatively low vapor pressure (i.e., the vapor pressure of the second solvent is lower than the vapor pressure of the first solvent) so that the second solvent remains in the ink for a longer period of time to inhibit the ink from drying too fast. As such, the second solvent may have an evaporation point that is higher than the evaporation point of the first solvent. Additionally, the second solvent may modify the Hansen solubility parameters (HSP). The Hansen Solubility Parameters track the hydrogen, polar, and dispersive forces of a solvent. Solvent mixtures reliably change their parameters according to the volume fraction in the mixture. By altering the parameters with a second solvent, these parameters may be fine-tuned according to the volume fraction, which determines the solubility. By adding a second solvent, the vector that the mixture makes can be brought closer to the vector of the molecular species that caps the microparticle to allow for better dispersion of the particles. For instance, where PVP is present in the ink, the second solvent may have HSP high dispersive and hydrogen parameters.

In particular embodiments, the second solvent may include, but are not limited to, α-terpineol, nerol, N-acetyl pyrrolidone, acetonecyanhydrin, acetic anhydride, acetanilide, acetamide, acrylic acid, ascorbic acid, biuret, o-chlorothiophenol, diethylene glycol, catechol, 4-ethyl phenol, ethylene chlorohydrin, ferulic acid, furfuryl alcohol, thiodiethylenglycol, or mixtures thereof.

In one embodiment, the second solvent may include another alcohol-based solvent (different than the first alcohol-based solvent) that has an evaporation point that is higher than the evaporation point of the first solvent so as to maintain shelf life of the aerosol ink. For instance, such another alcohol-based solvent may include α-terpineol.

In one particular embodiment, one of the solvents (e.g., the first solvent) has a surface tension that is higher than the other solvent (e.g., the second solvent). Through the use of multiple solvents, the ratio of the dimensionless number, Ohnesorge's number, may be controlled by selecting first and second solvents with the varying viscosities and surface tensions, as well as controlling their respective volumetric ratios within the solvent system. Ohnesorge's number relates the viscous forces to inertial and surface tension forces of the solvent system. Ohnesorge's number relates the viscous forces to inertial and surface tension forces of the solvent system. Ohnesorge's number is calculated by the formula: viscosity/(square root of (density*surface tension*droplet diameter). Accounting for a 5 μm droplet diameter, embodiments of Direct-Write inks, Ohnesorge's number of the ink may be 0.04 to 0.4 (e.g., 0.03 to 0.2, such as 0.048 to 0.18). In one embodiment, for example, the first solvent may be n-Decane (surface tensions of about 23 mN/m), and the second solvent may be Dowanol™ (surface tension of 70 mN/m), which is a glycol ether based solvent available commercially from The Dow Chemical Company.

When at least two solvents are present, such as described above, the first solvent and the second solvent may be present in a volumetric ratio of 4:1 to 12:1 (e.g., in a volumetric ratio of 7:1 to 10:1).

In certain embodiments, the palladium-chromium alloy microparticles may be loaded within the solvent system to a maximum solvable amount. For example, the palladium-chromium alloy microparticles may be present in a loading amount of 5% to 30% by weight of the total aerosol ink (e.g., in a loading amount of 5% to 10% by weight of the total aerosol ink).

At least one additive may also be present in the aerosol ink. The additives may be included to help extend the shelf life of the aerosol ink and increase the stability of the palladium-chromium alloy microparticles. For example, the aerosol ink may include at least one additive selected from a dispersant, a capping agent, a solvating agent, a solvent, an additive compatible with the chromium of the palladium-chromium alloy microparticles, a radical scavenger, or a combination thereof. That is, such additives may be compatible with the reactive chromium chemistry, and significantly differ than the common art used with more noble metal particles.

In one embodiment, for instance, the aerosol ink may include up to 5% by weight of a dispersant and/or a capping agent (e.g., 0.1% to 5% by weight). It is noted that certain additives may serve a dual purpose of acting as a dispersant and a capping agent. Dispersants may be included within the aerosol ink to inhibit conglomeration of the microparticles, such as polymer dispersants (e.g., polyvinylpyrrolidone, polyvinyl alcohol, etc.) and ammonium salts of simple acid-based compounds (e.g., ammonium ethylenetetraacetic acid), or mixtures thereof. Suitable capping agents may be included within the aerosol ink to inhibit chemical interaction and/or reaction between a solvent (e.g., an alcohol species of the solvents) and the microparticles, such as thio-based capping agent, polymer-based capping agents (e.g., polyvinylpyrrolidone, polyvinyl alcohol, long chain and/or bulky thiols such as n-decanethio, dodecane thiol, etc.), or mixtures thereof.

The aerosol ink may include, in certain embodiments, up to 5% by weight of a solvating agent(s). A solvating agent may be included within the aerosol ink to facilitate the interaction of solvent with the dispersed microparticles. In certain embodiments, the solvating agents may be interchangeable with the dispersants. However, solvating agents may be favored over dispersants if they are less bulky or sterically hindered than the dispersants. For instance, solvating agents may include, but are not limited to, acetic acid, ethylenediaminetetraacetic acid (EDTA), or mixtures thereof.

The aerosol ink may include, in certain embodiments, up to 1% by weight of a radical scavenger(s) to serve as a reducing agent. The radical scavenger may be present to interact with any radicals formed from the chromium-containing metallic microparticles during storage and/or printing processing (particularly those radicals formed during aerosolization of the ink). Suitable radical scavengers may include, but are not limited to, hydrazine, hindered amine light stabilizers (e.g., tetramethyl piperidine), ascorbic acid, hydroquinone and its derivatives, catechols, organo phosphites, or mixtures thereof.

As stated, the aerosol inks may be utilized in a non-contact printing process to form chromium-containing metal layers and/or components. Examples of non-contact printing include, but are not limited to, direct write, inkjet, dispenser, and spray coatings. For example, the aerosol inks may be used to form specific patterns for electrical contacts on a component (e.g., a wafer). The non-contact printing techniques utilize finite nozzles that distribute the ink to the substrate surface.

Referring to FIG. 1 and FIG. 2, a schematic diagram of an exemplary direct write system 10 is shown having a nozzle 12 moveable over a surface 14 of a component 16. The nozzle size for a typical direct write print head is less than 300 μm, though the nozzle size may be adjusted for the particular printing application. The nozzle 12 is moved in a controlled manner over the surface 14 of the component 16 in accordance with instructions from a controller 22. The nozzle 12 applies the aerosol ink 18 onto the surface 14 to form a chromium-containing metal layer 20 thereon. As discussed in greater detail above, the aerosol ink 18 includes a plurality of chromium-containing metallic microparticles 24 within a solvent system 26 and any soluble additives therein. The aerosol ink 18 may be supplied to the spray head 13 (including at least one nozzle 12) from the storage container 28 via the supply line 30.

A gas supply 32 is shown having multiple gas lines (first gas line 34 and second gas line 36) to provide gas flows to the nozzle 12. In one embodiment, the first gas line 34 provides a first gas flow to the nozzle 12, which serves as an atomizer flow for mass transfer of the aerosol ink during printing. The second gas line 36 may provide a second gas flow to the nozzle 12, which serves as a focusing mass flow (e.g., a sheath gas flow) to concentrate the aerosol ink exiting the nozzle 12. In one embodiment, the component 16 may be positioned on a heating element 17 so as to control the temperature of the component 16 during printing. Through control of the gas flows and the temperature of the component, the drying time of the ink applied may be controlled as desired.

As stated, the operation of the nozzle 12, the flow of the gasses (e.g., the first gas flow and the second gas flow), and/or the temperature of the component 16 (e.g., via the heating element 17) may be controlled by a processing device or controller 22 that may be operatively coupled to a control panel (not shown) for user manipulation to regulate operation of the direct write process. In response to user manipulation of the control panel or a computer program, controller 22 operates the various components of direct write system 10 to execute printing processes. As described in more detail below with respect to FIG. 3, controller 22 may include a memory and microprocessor, such as a general or special purpose microprocessor operable to execute programming instructions or micro-control code associated with methods described herein. Alternatively, controller 22 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. The control panel and other components of direct write system 10 may be in communication with controller 22 via one or more signal lines or shared communication busses.

FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 100 are explained using direct write system 10 as an example, it should be appreciated that these methods may be applied to manufacturing process using any suitable direct write machine, and other non-contact printing methods/systems.

FIG. 3 depicts certain components of controller 22 according to example embodiments of the present disclosure. Controller 22 can include one or more computing device(s) 22A which may be used to implement methods as described herein. Computing device(s) 22A can include one or more processor(s) 22B and one or more memory device(s) 22C. The one or more processor(s) 22B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 22C can include one or more non-transitory computer-readable storage medium(s), such as RAM, ROM, EEPROM, EPROM, flash memory devices, magnetic disks, etc., and/or combinations thereof.

The memory device(s) 22C can include one or more computer-readable media and can store information accessible by the one or more processor(s) 22B, including instructions 22D that can be executed by the one or more processor(s) 22B. For instance, the memory device(s) 22C can store instructions 22D for running one or more software applications, displaying a user interface, receiving user input, processing user input, etc. In some implementations, the instructions 22D can be executed by the one or more processor(s) 22B to cause the one or more processor(s) 22B to perform operations, e.g., such as one or more portions of methods described herein. The instructions 22D can be software written in any suitable programming language or can be implemented in hardware. Additionally, and/or alternatively, the instructions 22D can be executed in logically and/or virtually separate threads on processor(s) 22B.

The one or more memory device(s) 22C can also store data 22E that can be retrieved, manipulated, created, or stored by the one or more processor(s) 22B. The data 22E can include, for instance, data to facilitate performance of methods described herein. The data 22E can be stored in one or more database(s). The one or more database(s) can be connected to controller 22 by a high bandwidth LAN or WAN, or can also be connected to controller through network(s) (not shown). The one or more database(s) can be split up so that they are located in multiple locales. In some implementations, the data 22E can be received from another device.

The computing device(s) 22A can also include a communication module or interface 22F used to communicate with one or more other component(s) of controller 22 or direct write system 10 over the network(s). The communication interface 22F can include any suitable components for interfacing with one or more network(s), including for example, transmitters, receivers, ports, controllers, antennas, or other suitable components.

As stated above, methods are also provided for forming a palladium-chromium alloy based metallic layer on a surface of a substrate, including non-contact printing methods (e.g., direct write printing). FIG. 4 shows an exemplary method 40 that includes applying an aerosol ink, such as described above, to the surface of the substrate at 42 and allowing the aerosol ink to dry leaving the palladium-chromium alloy layer on the surface of the substrate at 44.

Also as stated above, methods are also provided for forming an aerosol ink, such as for use within non-contact printing methods (e.g., direct write printing). FIG. 5 shows an exemplary method 50 that includes purifying a plurality of palladium-chromium alloy microparticles to remove contaminants at 52 and mixing the purified plurality of palladium-chromium alloy microparticles with a solvent system at 54.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of making a plurality of microparticles from a reaction solution that includes an organic acid in a solvent, the method comprising:

adding a chromium salt and a palladium salt to the reaction solution;

bringing the reaction solution to a reaction temperature of 0° C. to 150° C. to form palladium cations and chromium cations within the reaction solution, wherein the palladium cations and chromium cations combine to form the plurality of microparticles that precipitate from the reaction solution, wherein the reaction solution further comprises trisodium citrate; and collecting the microparticles from the reaction mixture, wherein the plurality of microparticles comprises a palladium-chromium alloy.

2. The method of claim 1, wherein the palladium-chromium alloy comprises chromium in a weight percentage of 1% to 20% of a total weight of the palladium-chromium alloy.

3. The method of claim 1, wherein the chromium salt comprises chromium nitrate, chromium chloride, chromium acetic acid, or a mixture thereof.

4. The method of claim 1, wherein the palladium salt comprises palladium nitrate, palladium chloride, palladium acetic acid, or a mixture thereof.

5. The method of claim 1, wherein the reaction solution further comprises sodium nitrate.

6. The method of claim 5, wherein the sodium nitrate is present in the reaction solution at a molar ratio of sodium nitrate to a total of the chromium cations and palladium cations, wherein the molar ratio is greater than 2.

7. The method of claim 6, wherein the reaction solution comprises a molar ratio of sodium nitrate to the organic acid of 2 to 30.

8. The method of claim 7, wherein the organic acid comprises tannic acid.

9. The method of claim 8, wherein the reaction solution comprises a molar ratio of sodium nitrate to tannic acid of 3 to 20.

10. The method of claim 1, wherein the microparticles are nanoparticles having an average size of 5 nm to 30 nm.

11. The method of claim 1, wherein the reaction solution is free from a catalyst.

12. The method of claim 1, wherein at least 95% by weight of the chromium and palladium is extracted from the method in the form of the microparticles.

13. A method of making a plurality of microparticles from a reaction solution that includes nitrate anions and tannic acid in a water, the method comprising:

adding chromium nitrate and palladium nitrate to the reaction solution at a reaction temperature of 60° C. to 80° C. to form palladium cations and chromium cations within the reaction solution, wherein the palladium cations and chromium cations combine to form the plurality of microparticles that precipate from the reaction solution, and wherein a resulting palladium-chromium alloy comprises chromium in a weight percentage of 5% to 13% of a total weight of the palladium-chromium alloy; and collecting the microparticles from the reaction solution, wherein the plurality of microparticles comprises a palladium-chromium alloy.

* * * * *

UNITED STATES PATENT AND TRADEMARK OFFICE
CERTIFICATE OF CORRECTION

PATENT NO. : 11,311,941 B2
APPLICATION NO. : 16/372002
DATED : April 26, 2022
INVENTOR(S) : Lefebvre et al.

Page 1 of 1

It is certified that error appears in the above-identified patent and that said Letters Patent is hereby corrected as shown below:

In the Claims

In Column 12, Claim 13, Line 21, delete "precipate" and insert -- precipitate --.

Signed and Sealed this
Sixth Day of June, 2023

Katherine Kelly Vidal
*Director of the United States Patent and Trademark Office*